United States Patent [19]

Merry

[11] Patent Number: 4,465,011

[45] Date of Patent: Aug. 14, 1984

[54] HALYARD STOPPER

[75] Inventor: Carl A. Merry, Marion, Mass.

[73] Assignee: Schaefer Marine, Inc., New Bedford, Mass.

[21] Appl. No.: 399,212

[22] Filed: Jul. 19, 1982

[51] Int. Cl.³ .................................................. B63B 21/08
[52] U.S. Cl. ....................................... 114/199; 24/134 R; 24/134 L
[58] Field of Search ............. 24/134 R, 134 L, 135 L; 74/522.5, 526, 527, 532, 502; 114/199; 294/136; 308/3 C, 3 R

[56] References Cited

U.S. PATENT DOCUMENTS

| 637,820 | 11/1899 | Osborne | 114/199 |
|---|---|---|---|
| 1,710,697 | 4/1929 | Gilbert | 114/199 |
| 3,091,207 | 5/1963 | Songer | 114/199 |

Primary Examiner—Trygve M. Blix
Assistant Examiner—Edwin L. Swinehart
Attorney, Agent, or Firm—Cesari and McKenna

[57] ABSTRACT

A halyard stopper for a sailboat includes a pair of spaced-apart side plates extending up from a base. A jamming arm in the form of a class two lever is pivotally mounted between the plates above the base adjacent the entrance end of the stopper so that the arm can be swung from a jamming position wherein its free end is disposed close to the base and a nonjamming position wherein its free end is spaced further away from the base. A class one lever pivotally mounted between the side plates adjacent the exit end of the stopper is swingable so as to engage the free end of the arm and move the arm from its jamming to its nonjamming position even though the arm is under a very large jamming load.

13 Claims, 4 Drawing Figures

HALYARD STOPPER

This invention relates to a marine fitting. It relates more particularly to an improved halyard stopper for use on sailing vessels.

BACKGROUND OF THE INVENTION

Halyards comprise the running rigging used to raise and lower the sails on sailing craft. The halyard extends from the boat deck to the head of the mast where it is trained around a sheave. One end of the halyard is secured to the sail, the opposite free end often extends under a turning block at the foot of the mast and passes through a halyard stopper anchored to the boat deck or superstructure. The stopper is designed so that the free end of the halyard can be pulled freely in a direction that will raise the sail. However, the stopper prevents travel of the halyard in the opposite direction that will lower the sail, at least until the stopper has been intentionally disengaged from the halyard when it is actually desired to lower the sail.

There are several different varieties of halyard stopper in existence today. The simplest one is basically a jam cleat which has a fixed base formed with teeth and an arcuate cam also formed with teeth pivotally positioned opposite the fixed surface. The curvature of the cam and the inclination of their teeth are such that, when a line is threaded between them, the line can be pulled in one direction that tends to swing the cam away from the base. However, when the line is pulled in the opposite direction, it is engaged by the teeth with the result that the cam is pivoted ever more tightly toward the base, thereby jamming the line. The stopper can be released to disengage the line by manually pivoting the cam away from the base.

The main disadvantage of that type of fitting for use as a halyard stopper stems from the fact that a halyard is often under tremendous tension, on the order of 3,000 to 4,000 pounds. Therefore, once that line is pulled in to raise a sail and is released, the tension on the line in the opposite direction jams the cam toward the base to such an extent that it is very difficult to swing the cam away from the base in opposition to that large force. It is easier to release the stopper if the line is pulled in at the same time. However, that often requires two pairs of hands.

Attempts have been made to design stoppers which can be released easily by one hand even though the halyards which they control are under very high tension. One type of prior stopper of which we are aware comprises a jam cleat whose cam member can be pivoted relative to the base by way of an eccentric. When a line is passed between the cam and the base, the line can be pulled in one direction which tends to pivot the cam away from the base. However, tension on the line in the opposite direction causes the cam to pivot toward the base and jam the line. This type of stopper is released by rotating the eccentric which essentially swings the cam pivot away from the base so that the line is free to move in both directions. That conventional stopper is overly expensive. This is mainly because its cam requires a large socket for the eccentric. Therefore, it has to be a cast or machined part; it cannot be extruded.

Another prior halyard stopper employs a toothed base having a curved toothed cam surface pivotally mounted above the base. A relatively complex lever arrangement operates the cam. That prior stopper is disadvantaged in that, when the tensile force on the line is intermittent, its cam chatters, i.e. pivots rapidly toward and away from the base in such a way as to permit the line to pay out intermittently. Moreover, any given size of that type halyard stopper can only handle a given size line. In other words, if it is desired to change the diameter of the running rigging on a particular boat, it is necessary to change the size of that type stopper correspondingly. Another disadvantage of that prior halyard stopper is that the position of its cam is such as to interfere with the threading of the leading end of the line into the stopper. Also, when the halyard is pulled in, the stopper tends to chafe and abrade the line thereby shortening the life of the line.

Still another type of prior halyard stopper employs a fixed toothed base and a spring-loaded, over-center toothed cam mounted on a pivot arm which is swung down against the base by a lever arm. This type of stopper is also difficult to load in that the spring-loaded cam inhibits passage of the leading end of the line between the cam and the base. For the same reason, the stopper chafes the line when the line is pulled in. Still further, the lever arm of that type stopper is located at the bottom of the fitting and projects out therefrom. Consequently, moving lines in the vicinity of the stopper tend to catch and release the arm, thereby inadvertently releasing the halyard. That prior stopper also retains only certain size lines. More particularly, when its lever arm is in one orientation, the stopper will jam one size line. However, the lever arm can be flipped over so as to present a different orientation enabling the stopper to jam a second line of different size.

In use, when the handle of that type halyard stopper is in its locked position, there is no ready movement of the halyard in either direction. One can pull in on the halyard by applying a relatively high tensile force to the halyard. This causes the over-center cam to compress the engaged segment of the halyard to the extent that the cam swings away from the base and releases the halyard. However, the required force is quite large. In order to reduce the amount of force required to pull in on the halyard, one may partially release the stopper. In that event, however, the halyard is free to move in both directions, which is undesirable.

Aside from the simple jam cleat, the prior halyard stoppers are quite complicated and incorporate several parts which are relatively difficult to fabricate. Accordingly, the prior fittings are quite expensive. Also, some are quite wide so that they occupy a relatively large amount of space when stacked side by side as they often are in use.

SUMMARY OF THE INVENTION

Accordingly, the present invention aims to provide an improved halyard stopper for sailing vessels.

Another object of the invention is to provide a halyard stopper which permits ready movement of a line in one direction, but promptly jams the line when it starts to move in the opposite direction.

A further object of the invention is to provide a halyard stopper which can be released readily to disengage the line even though the line is under a very high tensile load.

Still another object of the invention is to provide a halyard stopper which readily accepts the leading end of a halyard.

Another object of the invention is to provide a stopper of this type which does not chafe the halyard.

Yet another object of the invention is to provide an improved halyard stopper which is composed of a relatively few different parts which are easily manufactured in quantity.

A further object of the invention is to provide a halyard stopper which is relatively inexpensive to make and assemble.

Still another object of the invention is to provide a halyard stopper which is quite narrow so that a plurality of such stoppers can be stacked side by side in a minimum amount of space.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

In general, my halyard stopper comprises a fixed, toothed base which supports a pair of spaced-apart upstanding side plates. A relatively long arm is positioned between the side plates. One end of the arm is pivoted to the plates, the opposite end of the arm is enlarged and formed with a large crescent-shaped notch. The undersurface of that free end is positioned opposite the toothed base and is itself toothed. Moreover, the arm is spring-loaded so that the free end of the arm is biased toward the base.

A halyard can be threaded through the stopper by passing its leading end underneath the arm at the entrance end of the stopper and pushing that end between the free end of the arm and the base. The teeth on those components are angled or inclined away from that end of the stopper so that the line can slide through the stopper with the arm swinging up sufficiently to permit its passage.

However, when the line or halyard is pulled in the opposite direction, the teeth at the free end of the arm "bite" into the halyard causing the arm to pivot toward the base so that the line is securely jammed between the toothed arm and base.

The stopper further includes a generally J-shaped lever pivoted between the plates opposite the free end of the arm. The long leg of the lever extends up above the side plates. The short leg of the lever loosely engages in the notch at the free end of the jamming arm. When the lever is in its lower position to lock the stopper, its long leg extends generally parallel to the top of the stopper and its short leg is positioned midway in the jamming arm notch so that the arm is free to swing down under its bias against the base. Yet the arm can swing away from the base sufficiently to allow a halyard to be threaded through the stopper. Thus when the lever is in its lower position, the stopper arm permits that line to be pulled in through the stopper, but jams the line when the line starts to move in the opposite direction under a load.

The lever can be pivoted to unlock the stopper by lifting its long leg up above the stopper side plates. This causes the smaller leg to engage the upper wall of the arm notch and swing the arm away from the base thereby releasing the jamming force on the line and permitting the line to move in either direction.

Due to the specific configurations of the jamming arm and lever to be described in detail later, the lever has a very high mechanical advantage, permitting a very large amount of lifting force to be exerted on the free end of the arm to lift it. Therefore, the stopper can be released even when the halyard is under a tensile load as high as 3,000 or 4,000 pounds.

Also, the engagement of the arm and lever is such that when the stopper is locked, its arm will jam a wide variety of different sized lines without requiring any change or reorientation of the stopper parts.

The subject stopper is composed of only a few different parts. The main parts including the base, the arm and the lever can be sliced from long extrusions so that these components can be fabricated in quantity relatively inexpensively. Moreover, the halyard stopper can be assembled quite easily by the average production worker. Therefore, the overall cost of manufacturing the stopper is kept to a minimum. Accordingly, this marine fitting should find wide application, particularly on larger sailing vessels such as cruisers and racing boats.

BRIEF DESCRIPTION OF THE DRAWINGS

For a fuller understanding of the nature and objects of the invention, reference should be made to the following detailed description, taken in connection with the accompanying drawings, in which.

DESCRIPTION OF THE PREFERRED EMBODIMENT

Figure 1:
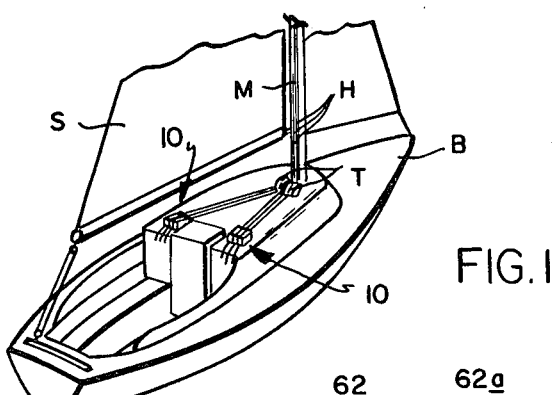
FIG. 1 is a perspective view of a sailboat incorporating my new halyard stopper.

Referring first to FIG. 1 of the drawings, there is shown there a boat B having a mast M. Halyards H are trained around sheaves in the masthead (not shown). One end of each halyard is adapted to be connected to a sail such as sail S; the opposite end segment of each halyard is passed under a turning block T at the foot of the mast and threaded through halyard stoppers shown generally at 10. Each halyard stopper when in its locked position, permits the corresponding halyard to be pulled in in order to raise the corresponding sail to the masthead. However, the stopper jams the halyard preventing its motion in the opposite direction as would tend to lower the sail. Each halyard stopper 10 can be adjusted to release the halyard so that the halyard can be paid out so as to lower the associated sail at the appropriate time.

Figure 2:
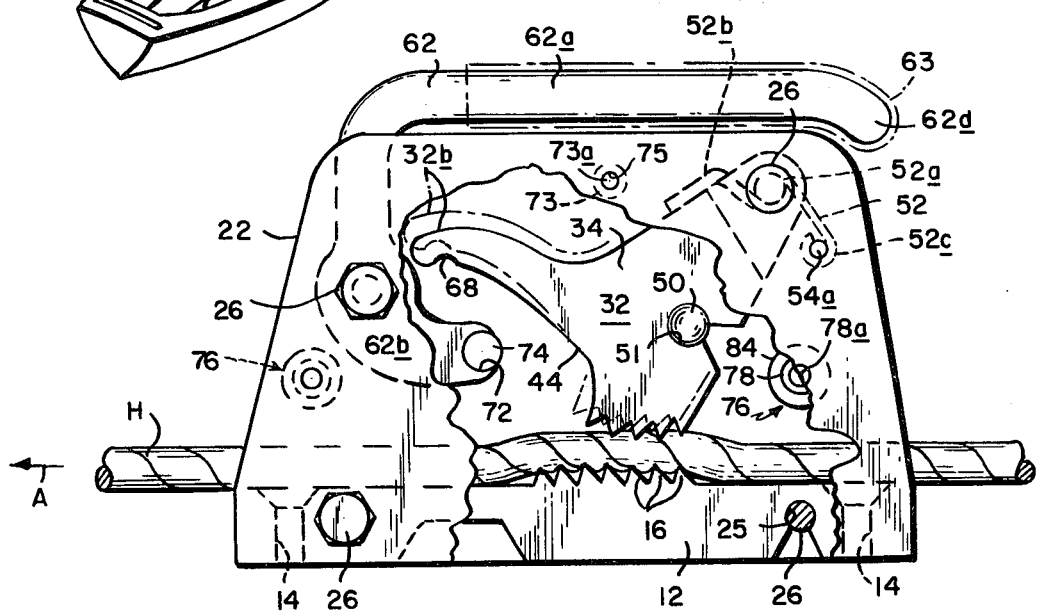
FIG. 2 is an elevational view on a larger scale of the FIG. 1 halyard stopper, with the stopper being shown in its locked position.
Figure 4:
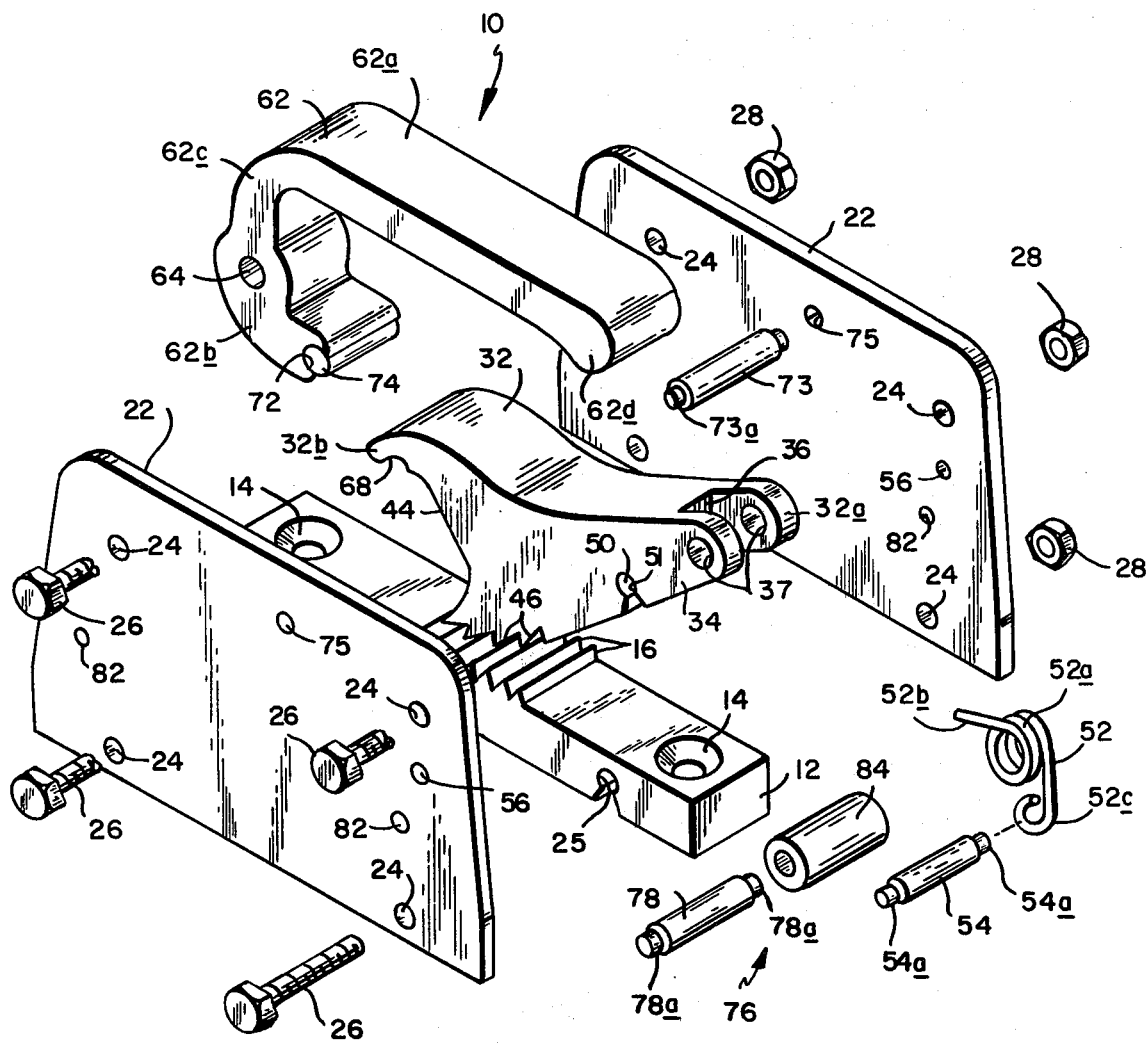
FIG. 4 is an exploded perspective view showing the components of the halyard stopper in greater detail.

Turning now to FIGS. 2 and 4, each halyard stopper 10 comprises a thin, narrow, generally rectangular base 12 made of a suitable salt-water-corrosion-resistant material such as anodized aluminum. A pair of countersunk openings 14 are drilled adjacent the opposite ends of base 12 for securing the stopper 10 to an appropriate structural surface on the boat B. Formed in the upper surface of base 12 intermediate its ends is a set of upstanding, laterally extending teeth or serrations 16. These teeth are angled or inclined in one direction, i.e. to the left as shown in FIGS. 2 and 4.

Projecting up from base 12 on opposite sides thereof are a pair of identical generally trapezoidal side plates 22 made of chrome plated steel. Each side plate has a pair of openings 24 adjacent its lower edge at opposite ends of the plate which register with lateral openings 25 extruded into the base 12. The plates are secured to the base by bolts 26 which extend through openings 24 and 25 and are held in place by nuts 28 turned onto the threaded bolt ends.

A second pair of bolts 26 extend through openings 24 adjacent the upper corners of those plates and are retained there by nuts 28.

Positioned between the plates is a jamming arm 32 made of aluminum metal for example. The arm has a relatively short neck 34 and a free end 32a which is formed with a slot 36. Also holes 37 are drilled through the slotted portion of the arm end for receiving the upper right-hand bolt 26 enabling the arm to be pivotally mounted between plates 22 above base 12.

The opposite end 32b of arm 32 is enlarged in the height direction and shaped somewhat like a crescent wrench, i.e. its upper and lower surfaces are rounded and it is formed with a relatively large generally arcuate end notch 44. The curved underside of arm end 32b is provided with a set of depending laterally extending teeth or serrations 46 which are positioned above teeth 16 on base 12. Each tooth 46 extends the full width of the arm 32 and the teeth are angled or inclined in the same direction as teeth 16, i.e. toward the left as viewed in FIGS. 2 and 4. Thus when the arm 32 pivots on its bolt 26, its toothed end 32b is swung toward or away from the teeth 16 on base 12. To minimize sliding friction between the arm and the side plate 22 when the arm is swung, a rod 50 is positioned in a lateral passage 51 extruded into arm 32. The rod is made of a self-lubricating plastic such as polyethylene and its ends project from the opposite ends of the passage so that they can rub against the side plates 22.

Arm 32 is is biased toward base 12 by a spring 52. The spring has a coiled section 52a which is engaged around bolt 26 in the arm slot 36. One end 52b of the coil 52a extends up and engages over the top of the arm neck 34. The opposite end 52c of the coil extends down and engages around a pin 54 located between the plates 22 below the arm bolt 26. Pin 54 has reduced diameter ends 54a which engage in small openings 56 spaced below and to the right of the upper right-hand plate openings 24.

Still referring in FIGS. 2 and 4, pivotally mounted on the upper left-hand bolt 26 directly opposite arm 32 is a relatively long extruded aluminum lever 62. Lever 62 is generally J-shaped having a long leg 62a which function as a handle. If desired, leg 62a may be provided with a plastic sheat or cover as shown in dotted lines at 63 in FIG. 2 to make it easier to grip. Lever 62 also has a short leg 62b which lies more or less parallel to leg 62a and extends into the notch 44 in arm 32. A lateral opening 64 is present at the curved bridging portion 62c of the lever which receives the bolt 26 and that location constitutes the lever fulcrum. The lever is swingable on its pivot at 26 between a stopper locking position illustrated in FIG. 2 wherein its long leg 62a extends along just above the top of plates 22 and a stopper releasing position shown in FIG. 3 in which the leg 62a projects up above the plates.

When the lever is in its FIG. 2 locking position, its short leg 62b extends more or less horizontally into the arm notch 44. However, the notch is large enough so that the arm 32 can still swing from a position shown in solid lines in FIG. 2 wherein its teeth 46 almost engage base 12 to an elevated position shown in dotted lines in that same figure wherein its end 32b is spaced further away from base 12. On the other hand, when the lever is moved towards its FIG. 3 releasing position, its leg 62b engages the upper wall of notch 44 thereby swinging arm 32 a considerable distance directly up away from base 12. A pin 73 having reduced diameter ends 73a retained in openings 75 near the tops of plates 22 above arm 32 limits the upward swing of the arm.

The stopper can be set to lock arm 32 in its raised position by providing a lateral recess or groove 68 in the upper wall of arm notch 44. When the lever 62 is swung up so that the end of its leg 62b engages in that groove, it functions as a detent to maintain the spring-loaded arm in its fully raised position. Preferably, the end of leg 62b is formed with a lateral groove 72 containing a rod 74 made of Delrin brand plastic or other such strong material to provide a bearing surface to prevent metal-to-metal rubbing of the lever and the arm when moving the lever between its two positions with a halyard H in the stopper as shown.

Desirably, a pair of halyard guides shown generally at 76 are provided above base 12 near the opposite ends thereof. For this, a pair of pins 78 with reduced diameter ends 78a are retained in small openings 82 in plates 22. Plastic sleeves 84 encircling the pins are in position to bear against the line threaded through the stopper.

To load the halyard stopper 10, the end of a halyard H is slid into the entrance or right-hand end of the stopper between base 12 and the right-hand guide 76. The lever 62 can be in either its lower locking position shown in FIG. 2 or in its releasing position illustrated in FIG. 3 during the loading operation. In the latter event, there is a clear passage for the halyard through the stopper between the base 12 and guides 76. In the former event, the end of the line pushes against the inclined arm teeth 46 and swings the arm 32 away from base 12 as shown in dotted lines in FIG. 2 by the amount necessary to enable the line to slide along base 12 until its end protrudes from the opposite end of the stopper. Then the halyard can be pulled through the stopper in the direction of arrow A in FIG. 2 until it is taut.

Thus, even when the lever 62 is in its locking position, its leg 62b does not interfere at all with the swinging motion of arm 32 toward and away from base 12 by the amount necessary to permit passage of the halyard H through the stopper in the direction of arrow A. As the halyard is drawn in through the stopper, the halyard simply rides over the inclined teeth 16 and 46 so that the teeth do not tend to chafe that line. It should be mentioned at this point that the bias provided by spring 52 does not clamp the arm tightly against the line as would cause excessive frictional engagement with the line. The spring need only be strong enough to ensure that the arm does swing downward as far as it is permitted despite the presence of salt, dirt and other debris at the arm pivot. Actually, if the arm 32 is heavy enough at its free end so that it will assuredly swing down under its own weight, the spring 52 may be omitted.

When the halyard H is pulled in the opposite direction, i.e. toward the right in the direction opposite arrow A in FIG. 2 due to a tensile load on the halyard and the lever is in its FIG. 2 locking position, the roughened surface of the halyard engages the edges of the arm teeth 46. This engagement tends to pivot arm 32 toward the base 12 so that the teeth 16 and 46 grip that line ever more firmly. As the tensile load increases, the teeth actually compressively bite into the line to assuredly stop the motion of the line in the let-out direction. Furthermore, the stopper responds quite quickly so that the line is jammed to a stop almost as soon as the tensile load is applied. Moreover, due to the bias on the arm, there is no chattering or intermittent jamming action as the tensile load fluctuates.

The jamming action of the stopper is also quite strong and reliable. In fact, the present stopper is able to handle tensile loads as large as 3,000 or 4,000 pounds which are the customary halyard loads on the larger sailing vessels. However, if the halyard H should be drawn in further in the direction of arrow A, the leftward motion of that line immediately tends to pivot the arm 32 away from base 12 easing its clamping engagement against the line so that the line moves easily over the inclined surfaces of the teeth 16 and 46. Resultantly, in use, the halyard H suffers a minimum amount of chafing due to its movement through stopper 10.

It is important to note that when the lever 62 is in its locking position, its long leg or handle 62a lies snugly against plates 22 at the top of the stopper. Furthermore, the free end 62d of that handle is rounded and projects only slightly beyond the ends of the plates 22. Therefore, there is a minimum likelihood of moving lines in the vicinity of the stopper catching on the lever and inadvertently releasing the stopper.

Figure 3:
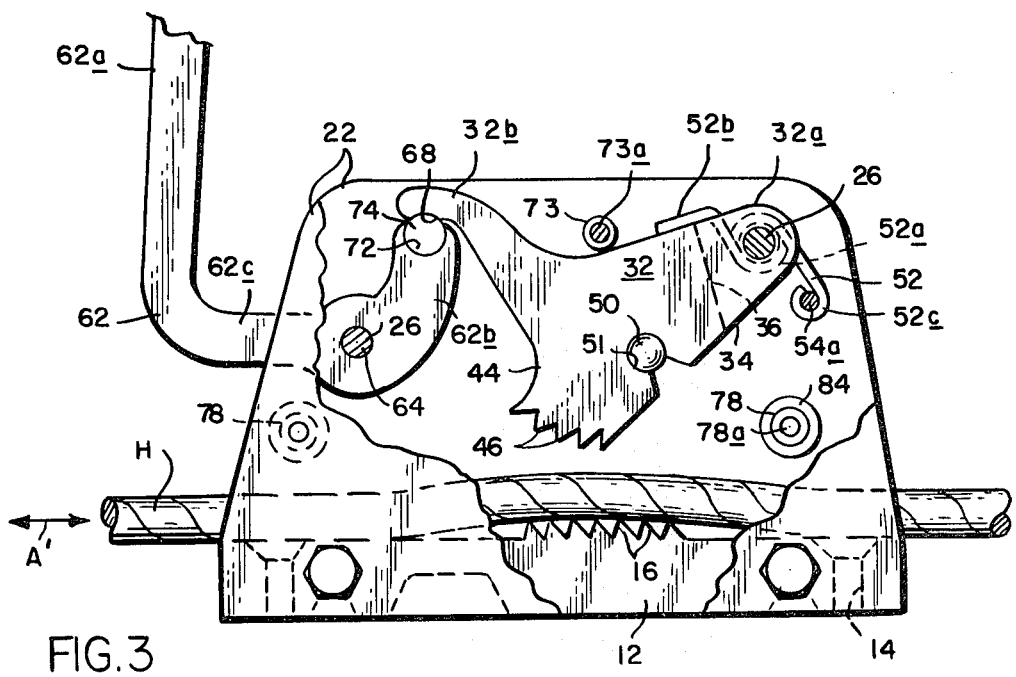
FIG. 3 is a similar view with parts broken away showing the halyard stopper in its unlocked position.

The jamming action of the halyard stopper 10 is released or relieved to permit the halyard to be let out through the stopper by lifting the lever leg 62a to its raised position shown in FIG. 3. Resultantly, the halyard is free to slide over its base 12 in either direction as shown by double headed arrow A' in FIG. 3 without suffering any appreciable chafing.

The lever 62 is essentially a Class 1 lever in the nature of a prybar whose leg 62b engages the upper wall of notch 44 and exerts a substantial lifting force on the arm end 32b at the upper end of notch 44 when lever leg 62a is swung to its raised position. In the illustrated stopper, the lever leg 62a is about five times as long as leg 62b, creating a mechanical advantage of about five. Also, arm 32 is, in reality, a Class 2 lever wherein a lifting force is applied by lever leg 62b to the upper end of the arm notch 44 and a downward load is applied by the tensioned halyard H at the arm teeth 46. These teeth are about one-half of the horizontal distance from the arm pivot or fulcrum to the engaged end of the arm so that the arm achieves a mechanical advantage of about 2. Thus the lever and arm together produce a lifting force at the arm teeth 46 which engage the tensioned halyard H which is on the order of ten times the lifting force applied to lever leg 62a.

Therefore, even though the halyard H is under a tension of 3,000 to 4,000 pounds, which force exerts torque on arm 32 in the counterclockwise direction to jam the halyard, due to the aforesaid high mechanical advantage, the halyard can still be released quite easily by the sailor lifting the lever leg 62a.

If the lever 62 should be lowered again to its locking position of FIG. 2, arm 32 drops and immediately reengages and jams the halyard H.

If it is desired to maintain the stopper 10 in its unlocked condition, lever leg 62a is swung up until rod 74 engages in arm recess 68. That engagement maintains both the lever and the arm in their positions illustrated in FIG. 3.

It is important to note also that when the stopper 10 is in its locked position shown in FIG. 2, the arm still has a considerable degree of freedom in the vertical direction. Furthermore the arm teeth 46 are angled such that those teeth grippingly engage and jam the line even though the arm may be oriented at slightly different angles relative to the base 12. Therefore, the stopper is able to accommodate lines and halyards of different diameters. Actually the same stopper 10 can accommodate lines whose diameters may vary over a range as high as ⅜ inch. In practice, however, the subject stopper is made in two sizes, one to handle up to ⅜ inch diameter line and the other to handle from ⅜ to ¾ inch diameter line. Of course, the stopper parts can be scaled up appropriately to handle larger size line. The point is that, unlike prior comparable fittings of this general type, applicant's stopper in a given size will properly handle different size lines and accomplish this without requiring any alteration or reorientation of its parts.

It will be seen from the drawing figures also, particularly FIG. 4, that applicant's stopper is composed of a relatively few different parts. Aside from the fasteners, sleeves and pins which are standard parts, the stopper comprises only five different parts, i.e. base 12, plate 22, arm 32, spring 52 and lever 62. Furthermore, these parts are easily fabricated in quantity. The base 12, the arm 32 and the lever 62 are all designed so that they can be sliced from long extrusions. The plate 22 is a simple stamped metal part and the spring 52 is an inexpensive formed wire part that can be produced in quantity inexpensively. Furthermore, all of these components are easily assembled by the average production worker without any special tools or equipment. Therefore, the overall cost of producing stopper 10 is kept to a minimum.

The overall dimensions of the stopper, and particularly its width, are also kept to a minimum. Therefore, when installed on a boat, the stopper does not constitute an obstruction. Since the stopper is so thin, several of them can be secured together in parallel as shown at 10 in FIG. 1 and still maintain a relatively small overall envelope. In such a multiple stopper, only a single plate 22 is required between each stopper in the unit and all the stoppers are held together by four bolts 26 which are long enough to extend through all of the stoppers in the unit.

Yet with all of these advantages, stopper 10 is rugged and reliable and simple to operate. Therefore, it should find wide application on sailing vessels requiring marine fittings of this type.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. A line stopper having an entrance end and an exit end, said stopper comprising
   A. a base;
   B. a pair of spaced-apart side members extending generally perpendicular to the base;
   C. line jamming means in the form of a class two lever pivoted at its fulcrum between the side members above the base near the entrance end of the stopper;

D. a lever movably mounted to said side members above the base near the exit end of said stopper for applying a force directed away from the base to a part of said line jamming means, said lever
  1. being pivoted at its fulcrum between the side members above the base near the exit end of the stopper;
  2. having its short leg extending from its said fulcrum to said line jamming means part; and
  3. having its long leg extending from its said fulcrum to an accessible location adjacent an edge of the stopper;
E. line gripping teeth or serrations formed on a surface of said line jamming means opposite the base and between said fulcrum and said line jamming means part; and
F. means on said line jamming means and said lever short leg for releasably maintaining said line jamming means surface spaced appreciably from the base.

2. The stopper defined in claim 1 and further including means for urging said line jamming means surface toward the base.

3. A line stopper having an entrance end and an exit end, said stopper comprising
A. a base;
B. a pair of spaced-apart side members extending generally perpendicular to the base;
C. a jamming arm positioned between the side members;
D. pivot means connecting one end of said arm facing said stopper entrance end to said side members so that the arm is swingable between a jamming position wherein its opposite free end facing the exit end of said stopper is positioned close to the base and a nonjamming position wherein said free end is spaced further away from the base;
E. line-gripping means formed on a surface opposite the base between said pivot means and the free end of the jamming arm;
F. means urging the arm toward its jamming position;
G. lever means positioned between the side members near the exit end of the stopper, said lever means having
  1. a pivotal connection to the side members defining a fulcrum;
  2. a relatively long leg extending from the fulcrum to an accessible location beyond the side members; and
  3. a relatively short leg extending from the fulcrum to a location opposite a surface at the free end of said arm so that when the lever means is swung on its pivot in a selected direction to a releasing position, its short leg engages said arm end surface and swings the arm away from the base with a considerable releasing force; and
H. means for maintaining the lever means in its releasing position, said maintaining means including a notch or depression adjacent the free end of the arm and a rounded surface at the end of said short lever means leg which engage and interfit when the lever means is in said releasing position and the arm is in said nonjamming position.

4. The stopper defined in claim 2 wherein the urging means comprises a mass concentration spaced from the pivot connecting the jamming means to the side members.

5. The stopper defined in claim 2 wherein the urging means comprises a spring reacting between the jamming means and the side members.

6. The stopper defined in claim 2 and further including means for limiting the pivoting movement of the jamming means away from the base.

7. The stopper defined in claim 2 and further including means supported by the side members adjacent the entrance and exit ends thereof between the base and the pivots of the jamming means and lever for guiding line through the stopper.

8. The stopper defined in claim 3 wherein the line-gripping means comprises serrations or teeth
A. extending laterally across the arm and
B. being tilted or angled away from the entrance end of the stopper.

9. The stopper defined in claim 1 wherein the maintaining means comprises coacting means at the end of the short leg and at the line jamming means part which engage and interfit when the lever is in its releasing position and the jamming means is in its nonjamming position.

10. The apparatus defined in claim 3 wherein the lever means is J-shaped with its legs extending generally parallel to one another and its pivotal connection being located at the root of the said short leg.

11. A line stopper having an entrance end and an exit end, said stopper comprising
A. a base;
B. a pair of spaced-apart side members extending generally perpendicular to the base;
C. a jamming arm positioned between the side members;
D. pivot means connecting one end of said arm facing said stopper entrance end to said side members so that the arm is swingable between a jamming position wherein its opposite free end facing the exit end of said stopper is positioned close to the base and a nonjamming position wherein said free end is spaced further away from the base;
E. line-gripping means formed on a surface opposite the base between said pivot means and the free end of the jamming arm;
F. means urging the arm toward its jamming position;
G. lever means positioned between the side members near the exit end of the stopper, said lever means having
  1. a pivotal connection to the side members defining a fulcrum;
  2. a relatively long leg extending from the fulcrum to an accessible location beyond the side members; and
  3. a relatively short leg extending from the fulcrum to a location opposite a surface at the free end of said arm so that when the lever means is swung on its pivot in a selected direction to a releasing position, its short leg engages said arm end surface and swings the arm away from the base with a considerable releasing force; and
H. bearing means mounted to the arm at a location spaced along and away from said pivot means and engaging the interior wall of at least one side member for minimizing sliding friction between the arm free end portion and the side member when the arm is swung between its two positions.

12. The stopper defined in claim 11 wherein the bearing means comprises
A. a lateral passage through the arm; and B. a plastic rod snugly positioned in said passage and projecting therefrom to engage at least one side member.

13. A line stopper having an entrance end and an exit end, said stopper comprising
    A. a base;
    B. a pair of spaced-apart side members extending generally perpendicular to the base;
    C. a jamming arm positioned between the side members;
    D. pivot means connecting one end of said arm facing said stopper entrance end to said side members so that the arm is swingable between a jamming position wherein its opposite free end facing the exit end of said stopper is positioned close to the base and a nonjamming position wherein said free end is spaced further away from the base;
    E. line-gripping means formed on a surface opposite the base between said pivot means and the free end of the jamming arm;
    F. means urging the arm toward its jamming position;
    G. lever means positioned between the side members near the exit end of the stopper, said lever means having
        1. a pivotal connection to the side members defining a fulcrum;
        2. a relatively long leg extending from the fulcrum to an accessible location beyond the side members; and
        3. a relatively short leg extending from the fulcrum to a location opposite a surface at the free end of said arm so that, when the lever means is swung on its pivot in a selected direction to a releasing position, its short leg engages said arm end surface and swings the arm away from the base with a considerable releasing force; and
    H. wear means at the free end of said short leg for engaging said end arm surface when the lever means is moved between its two positions, said wear means including
        1. a recess in the free end of the short leg; and
        2. a plastic member retained in said recess and protruding toward said arm end surface.

* * * * *